(12) United States Patent
Fassolette

(10) Patent No.: US 10,795,385 B2
(45) Date of Patent: Oct. 6, 2020

(54) MIXING UNIT AND MIXER TAP COMPRISING SUCH A MIXING UNIT

(71) Applicant: VERNET, Ollainville (FR)

(72) Inventor: Pierre-Olivier Fassolette, Corbeil Essonnes (FR)

(73) Assignee: VERNET, Ollainville (FR)

( * ) Notice: Subject to any disclaimer, the term of this patent is extended or adjusted under 35 U.S.C. 154(b) by 79 days.

(21) Appl. No.: 16/096,684

(22) PCT Filed: Apr. 25, 2017

(86) PCT No.: PCT/EP2017/059716
§ 371 (c)(1),
(2) Date: Oct. 25, 2018

(87) PCT Pub. No.: WO2017/186670
PCT Pub. Date: Nov. 2, 2017

(65) Prior Publication Data
US 2019/0294185 A1 Sep. 26, 2019

(30) Foreign Application Priority Data
Apr. 26, 2016 (FR) ..................... 16 53680

(51) Int. Cl.
*G05D 23/13* (2006.01)
*F16K 11/00* (2006.01)
*F16K 11/078* (2006.01)

(52) U.S. Cl.
CPC ...... *G05D 23/1353* (2013.01); *F16K 11/0787* (2013.01); *F16K 19/006* (2013.01)

(58) Field of Classification Search
CPC .... G05D 23/13; G05D 23/132; G05D 23/134; G05D 23/1353; F16K 11/0787; F16K 19/006; F16K 31/002; E03C 1/02
See application file for complete search history.

(56) References Cited

U.S. PATENT DOCUMENTS 3,248,056 A 4/1966 Obermaier
3,409,039 A 11/1968 Griffin
(Continued)

FOREIGN PATENT DOCUMENTS

CN 1262384 A 8/2000
CN 201763433 U 3/2011
(Continued)

OTHER PUBLICATIONS

French Search Report for Application No. FR 1656965 dated Mar. 15, 2017.
(Continued)

*Primary Examiner* — Marc E Norman
(74) *Attorney, Agent, or Firm* — Troutman Pepper Hamilton Sanders LLP

(57) ABSTRACT

The mixing unit for a mixer tap has a generally cylindrical shape defining a main axis and comprises a cartridge comprising a mixing chamber traversed by the main axis, wherein the mixing chamber comprises intakes of the incoming stream and an outlet for an outgoing stream. The mixing unit comprises means for mixing the incoming steams to form the outgoing stream contained in the mixing chamber, and an additional casing extending out of the mixing chamber. According to the invention, the mixing unit comprises a single-piece common part which delimits the mixing chamber, while forming at least a portion of the additional casing. The common part forms a separation wall between the cartridge and the additional casing, extending in a plane that is orthogonal to the main axis, wherein the intakes and the outlet are formed through the separation wall.

11 Claims, 5 Drawing Sheets

(56) References Cited

U.S. PATENT DOCUMENTS

| | | | |
|---|---|---|---|
| 4,257,553 | A | 3/1981 | Sliger |
| 4,283,823 | A | 8/1981 | Buswell |
| 4,630,770 | A | 12/1986 | Sliger |
| 4,691,861 | A | 9/1987 | Sliger |
| 4,763,834 | A | 8/1988 | Duprez |
| 5,549,244 | A | 8/1996 | Kai |
| 5,603,485 | A | 2/1997 | Schwarz |
| 5,899,378 | A | 5/1999 | Hainle |
| 8,028,926 | B2 | 10/2011 | Heldberg et al. |
| 8,028,936 | B2 | 10/2011 | McDermott |
| 9,133,942 | B2 | 9/2015 | Ito |
| 2002/0059906 | A1 | 5/2002 | Friesenhahn |
| 2002/0130189 | A1 | 9/2002 | Mace et al. |
| 2007/0261738 | A1* | 11/2007 | Mace .................. F16K 31/002 137/468 |
| 2008/0135633 | A1 | 6/2008 | Heldberg |
| 2009/0025809 | A1 | 1/2009 | Oh |
| 2010/0077583 | A1 | 4/2010 | Takaya |
| 2010/0089467 | A1 | 4/2010 | Boulay |
| 2010/0230504 | A1 | 9/2010 | Pottie |
| 2011/0198518 | A1 | 8/2011 | Habermann |
| 2013/0112763 | A1 | 5/2013 | Roman |
| 2013/0126624 | A1 | 5/2013 | Park |
| 2013/0180477 | A1 | 7/2013 | Nakajima |
| 2013/0200167 | A1 | 8/2013 | Auweder |
| 2013/0264393 | A1 | 10/2013 | Onishi |
| 2013/0334324 | A1 | 12/2013 | Ruga |
| 2014/0345711 | A1 | 11/2014 | Ueno |
| 2016/0108797 | A1 | 4/2016 | Palumbo |
| 2016/0333767 | A1 | 11/2016 | Pattie |
| 2018/0059693 | A1* | 3/2018 | Rodriguez ............ F16K 31/602 |
| 2018/0223508 | A1* | 8/2018 | Fassolette ............... E03C 1/041 |

FOREIGN PATENT DOCUMENTS

| | | |
|---|---|---|
| CN | 102536417 A | 7/2012 |
| DE | 19716307 A1 | 10/1998 |
| DE | 10 2005 001303 A1 | 7/2006 |
| EP | 1 020 671 A2 | 7/2000 |
| EP | 2335127 B1 | 3/2012 |
| FR | 2 841 348 A1 | 12/2003 |
| FR | 2876433 A1 | 4/2006 |
| FR | 3 003 046 A1 | 9/2014 |
| WO | 97/21949 A1 | 6/1997 |
| WO | 2005/124495 A1 | 12/2005 |
| WO | 2014/135614 A2 | 9/2014 |
| WO | 2015/086749 A1 | 6/2015 |

OTHER PUBLICATIONS

International Search Report and Written Opinion for Application No. PCT/EP2017/068407 dated Sep. 12, 2017.

International Search Report dated Jul. 4, 2016 during the prosecution of International Application No. PCT/EP2016/056547.

International Search Report dated Mar. 1, 2017 during the prosecution of PCT/EP2016/079878.

Rapport De Recherche Préliminaire issued in corresponding French Patent Application No. 1653676 dated Jan. 5, 2017 (in French).

International Search Report issued by the International Searching Authority in International Application No. PCT/EP2017/059708, dated Aug. 1, 2017, 3 pages total.

International Search Report issued by the International Searching Authority in International Application No. PCT/EP2017/059716, dated Aug. 4, 2017, 4 pages total.

* cited by examiner

MIXING UNIT AND MIXER TAP COMPRISING SUCH A MIXING UNIT

CROSS-REFERENCE TO RELATED APPLICATIONS

This is a U.S. national phase application under 35 U.S.C. § 371 of International Patent Application No. PCT/EP2017/059716, filed Apr. 25, 2017, which claims priority to French Application No. FR 1653680, filed Apr. 26, 2016. The entire contents of these applications are hereby incorporated by reference.

FIELD OF THE INVENTION

The present invention relates to a mixing unit and a mixer tap comprising such a mixing unit.

BACKGROUND

The invention relates to the field of sanitary taps. In particular, so-called "mixer" taps that make it possible to emit a mixed stream of running water by mixing a stream of hot water and a stream of cold water within a cartridge mounted in the body of the tap. The respective flow rates of the cold water and hot water streams admitted into the cartridge may be adjusted by means of a control lever, wherein adjustment of the temperature of the mixed stream may be effected by rotation of the lever about one axis, and the flow rate of the mixed stream by rotation of the lever about a second axis.

In most cases, the cartridge comprises a pair of perforated ceramic discs, wherein one is fixed and the other is movable under the action of the lever while being in flat contact with the fixed disc in a sliding and sealed manner. Channels are formed as a function of the position of the mobile disc on the fixed disc to allow admission of cold and hot water streams within the cartridge and with a greater or lesser stream, and thus allow their mixing in the formation of a mixed stream.

Some known cartridges may be provided with a separate additional casing, which is attached to the cartridge. For example, FR-B-2 876 433 discloses a cartridge for a mixer tap equipped with an additional thermostatic module that is sealingly-coupled to the base of the cartridge. The additional thermostatic module is provided with thermostatic means allowing, when the temperature of the mixed stream exceeds a predetermined threshold value, the blocking of the passage of hot water before entering the cartridge, in order to automatically limit the stream temperature. The assembly formed by the mixer tap and the thermostatic module comprises mixing means, formed by the ceramic discs, while the thermostatic means comprise a valve separate from these mixing means, to perform different functions.

Nevertheless, the addition of such an additional casing requires a step of assembling the cartridge with the additional casing during the manufacture of the valve, which makes the manufacture more complex and more expensive. In addition, sealing means between the cartridge and the additional casing must be provided, which also represents a substantial cost, otherwise there may be a risk of water leakage between the cartridge and the additional casing.

EP 2 335 127 B1 discloses a thermostatic mixing unit, comprising a cold water intake, a hot water intake, a mixed water outlet, a sliding valve and thermostatic means on which the sliding valve is mounted. However, this mixing unit does not include both means for mixing hot water with cold water to form the mixed flow, and a valve for the passage of hot water and actuated by a thermostatic element. If the aforementioned drawbacks, related to the assembly and provision of sealing means, do not arise for this known mixing unit, the function of blocking the passage of hot water is not provided separately from the function of mixing hot water and cold water by the sliding valve.

DE 197 16 307 A1 discloses a thermostatic mixer tap comprising a cartridge with hot and cold water intakes. The cartridge comprises, in its lower part, a system of discs controlled by a lever of the tap, which makes it possible to regulate the flow of water at the hot water and cold water intakes. The tap also comprises, above the disc system, a thermostatic element mounted within the cartridge and coupled to a valve. However, the cartridge of this known tap forms a complex assembly requiring the implementation of many parts and many sealing means.

Accordingly, the invention aims to overcome the disadvantages of the prior art by proposing a new mixing unit which is easier and less expensive to manufacture.

SUMMARY

The invention relates to a mixing unit for a mixer tap, wherein the mixing unit has a generally cylindrical shape defining a main axis of the mixing unit, and wherein the mixing unit includes:
  a cartridge, comprising a mixing chamber, traversed by the main axis, wherein the mixing chamber comprises:
    a first intake of a first incoming stream of fluid having a first temperature,
    a second intake of a second incoming stream of fluid having a second temperature greater than the first temperature, and
    an outlet from the mixing chamber, for an outgoing stream of fluid,
  means for mixing the first and second incoming streams to form the outgoing stream, wherein the mixing means are contained in the mixing chamber;
  an additional casing, extending out of the mixing chamber, wherein the additional casing is traversed by the main axis,
  thermostatic means, which are mounted within the additional casing and comprise:
    a thermostatic element, which comprises both a thermosensitive portion arranged at least partially at the outlet, and a portion that is movable in translation relative to the thermosensitive part, and
    a shutter for the second intake, which is translationally connected to the moving portion in translation.

According to the invention, the mixing unit comprises a one-piece common part, which at least partially delimits the mixing chamber while forming at least a portion of the additional casing, wherein the common part forms a separation wall between the cartridge and the additional casing, and wherein the partition wall extends in a plane that is orthogonal to the main axis, and wherein the first intake, the second intake and the outlet, traverse the partition wall and are distributed about the main axis.

By virtue of the invention, the common part, formed integrally within the mixing unit, connects the additional casing and the mixing chamber. The mixing unit thus forms a unitary whole, wherein the mixing chamber is partially delimited by the additional casing, in this case by the common part forming at least a portion of the latter. According to this configuration, it is advantageously not necessary to provide a step of assembling the mixing chamber with the additional casing in order to connect them. Thus, it is, in particular, not necessary to provide sealing means between the mixing chamber and the additional casing. The number of parts needed to manufacture the mixing unit is advantageously reduced. The manufacture of a mixer tap comprising such a mixing unit is therefore particularly simple, wherein the mixing unit may also be mounted as a block within the mixer tap.

According to other advantageous features of the invention, taken separately or in combination:

- the mixing unit comprises a control member formed by a lever, which is movably mounted at the top of the cartridge to control the mixing means and thus control the respective flow rate of the first incoming stream and the second incoming stream.
- the mixing means comprise a set of mixing discs contained in the mixing chamber, preferably three mixing discs, wherein the mixing discs are in surface contact with each other and extend in planes that are orthogonal to the main axis.
- the common part forms a peripheral cover delimiting the mixing chamber, wherein the peripheral cover rises from the separation wall;
- the mixing unit comprises a sealing crown which is attached to the peripheral cover, opposite the separation wall, to at least partially close the mixing chamber;
- the common part forms a through duct of the additional casing, wherein the through duct extends from the first intake;
- the common part forms a baffle duct of the additional casing, wherein the baffle duct extends from the second intake and is designed to be closed by the shutter;
- the common part forms a housing of the additional casing, wherein the thermostatic element is mounted in this housing;
- the mixing unit comprises a sealing crown of the mixing unit with a mixer tap body, wherein the sealing crown extends in a plane that is orthogonal to the main axis, and wherein the sealing crown comprises both a circular groove, which is centered on the main axis and which is formed by the common part, and a seal mounted within this circular groove; and
- the mobile part is movable in translation relative to the thermosensitive part along a sealing axis, wherein the orthogonal plane and the sealing axis intersect, and wherein the sealing axis is inclined relative to the orthogonal plane and traverses it.

The invention also relates to a mixer tap equipped with a mixing unit as defined above.

BRIEF DESCRIPTION OF THE FIGURES

The invention will be better understood upon reading the description which follows, given solely by way of nonlimiting example and with reference to the drawings, wherein.

DETAILED DESCRIPTION

Figure 1:
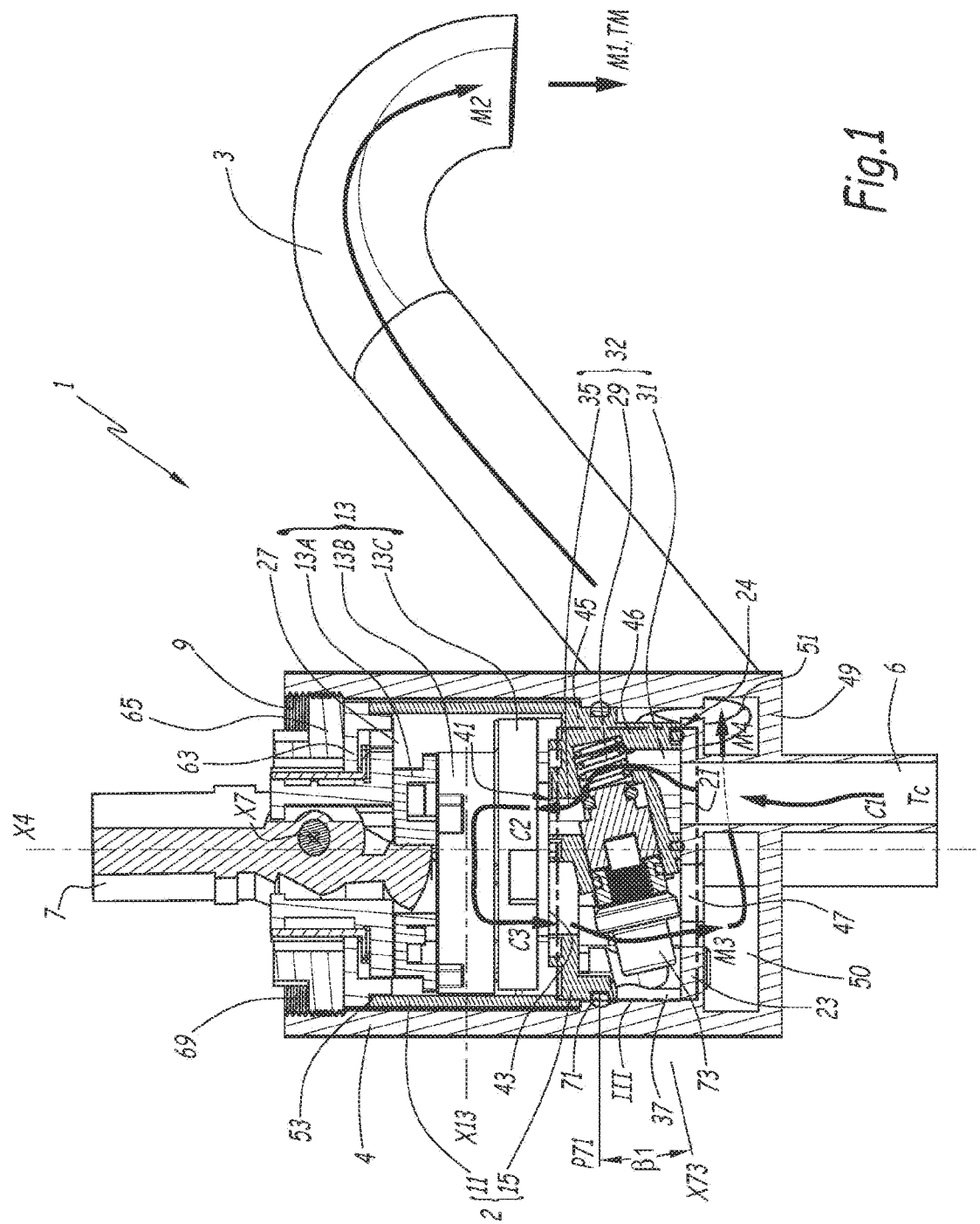
FIGS. 1 and 2 show longitudinal sections of a mixer tap comprising a mixing unit according to a first embodiment according to the invention.
Figure 2:
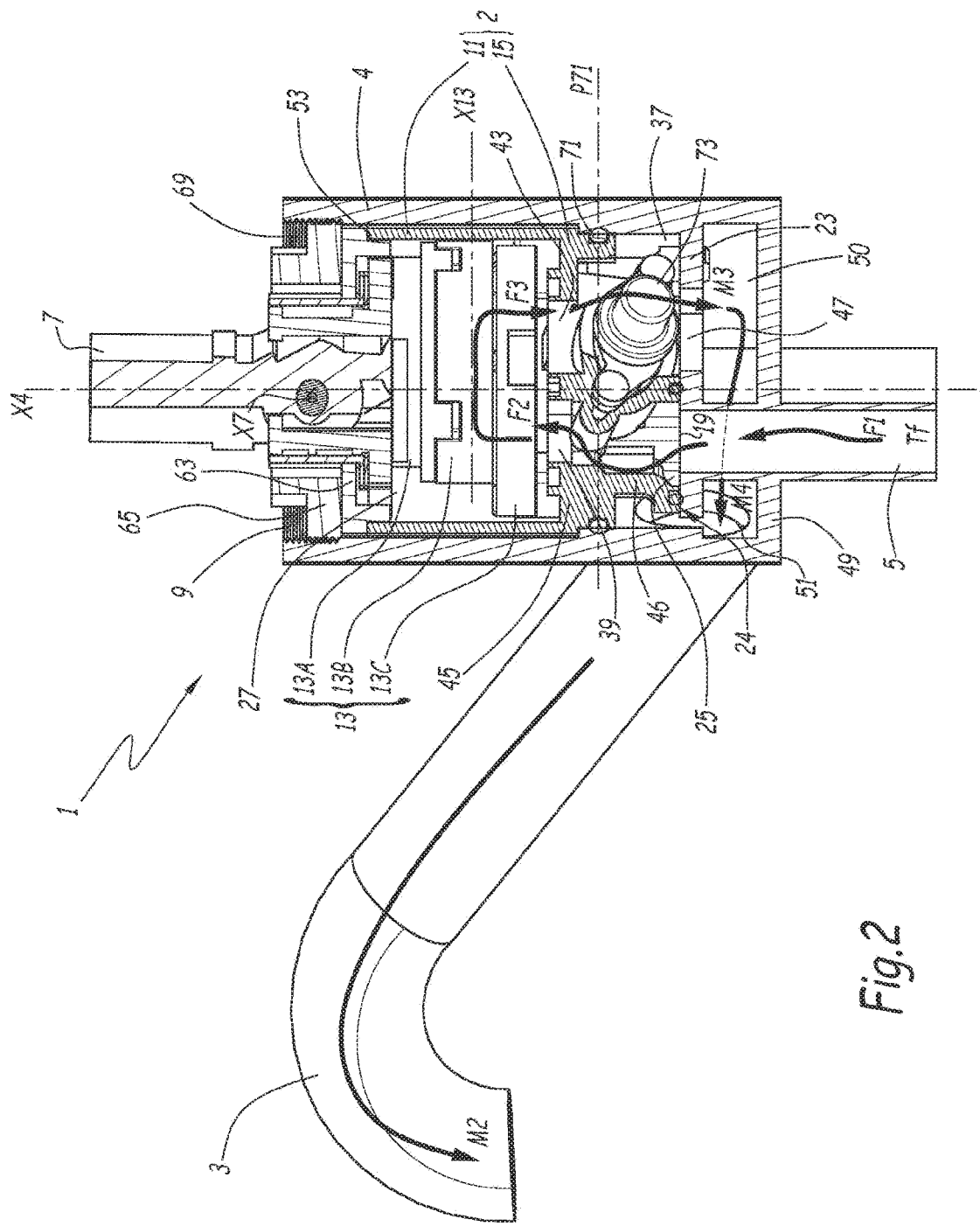

FIGS. 1 and 2 show a mixer tap 1 in which is inserted a mixing unit 2 according to the first embodiment mentioned above. The mixer tap 1 is preferably designed to be installed on a basin of the sink or shower type, or more generally within a sanitary installation. The mixer tap 1 comprises, in a conventional manner, a spout 3 from which a mixed stream of water shown by the arrow M1 is intended to be emitted. The tap 1 also comprises a body 4, which forms a hollow cylinder defining a main axis X4 which is intended, in this example, to be arranged vertically when the tap is mounted on the sanitary installation.

For convenience, the following description is oriented with respect to the main axis X4, wherein it is considered that the terms "upper" and "top" correspond to an axial direction facing the upper part of FIG. 1, while the terms "lower" and "bottom" correspond to an axial direction in the opposite direction.

As a variant (not shown), the axis X4 is arranged in a direction different from the vertical and is, for example, horizontal.

The spout 3 forms a curved duct extending upwards from the body 4 obliquely to the main axis X4, wherein the curvature of the spout 3 enables the stream of mixed water M1 be oriented downwards. The mixed stream of water thus progresses obliquely upwards in the spout along the arrow M2 to the open end of the latter.

The mixer tap 1 also comprises a cold water intake 5 which is visible in FIG. 2, and a hot water intake 6 which is visible in FIG. 1, and which are connected to the body 4 at a bottom end of the latter. The cold water intake 5 and the hot water intake 6 are provided to be connected to conventional water supply means of the sanitary installation that are not described in detail in the present description. The cold water progresses upwards in the intake 5, according to the arrow F1, at a temperature Tf. The hot water progresses upwards in the intake 6, according to the arrow C1, at a temperature Tc. The streams C1 and F1 are mixed within the mixer tap 1 to form the stream M1, at a temperature $T_M$ between Tf and Tc, and the added flow of the streams C1 and F1.

The mixing unit 2 is housed within the body 4 by being inserted into the latter through an upper opening 9 of the body 4 along the main axis X4. It is in this mixing unit 2 that the mixing of the incoming streams F1 and C1 takes place to form the outgoing stream M1.

The mixing unit 2 has a generally cylindrical shape that is coaxial with the main axis X4. The mixing unit 2 comprises, on the one hand, a cartridge 11, which contains means 13 for mixing the first incoming stream F1 and the second incoming stream C1 to form the outgoing stream M1, and, on the other hand, an additional casing 15.

The mixing unit comprises an integral common part 46, which forms a portion of the cartridge 11 and a portion of the casing 15. The common part 46 is a single piece and is preferably obtained by molding. The common part 46 is made, for example, of plastic.

The common part 46 forms, in particular, a separation wall 45 between the cartridge 11 and the additional casing 15, and extends in a plane that is orthogonal to the axis X4. Thus, the cartridge 11 is located in the upper portion of the body 4 and above the additional casing 15, which is located in the lower portion of the body 4 and apart from the cartridge 11, wherein the common part 46 forms the framework of the lower portion of the mixing unit 2.

The common part 46 forms a lower face 24 of the additional casing 15 by means of which the unit 2 is supported downwards against a support wall 23 of the body 4.

The support wall 23 is substantially discoidal and extends radially with respect to the main axis X4. The intakes 5 and 6 of the incoming streams F1 and C1 traverse the support wall 23 to supply the additional casing 15 via the lower face 24. In practice, the intakes 5 and 6 are respectively connected in a sealed manner to a first intake 19 of the first incoming stream F1, and a second intake 21 of the second incoming stream C1 opening on the surface of the lower face 24.

As shown in FIG. 2, the first incoming stream progresses along the arrow F1 to the first intake 19 and continues its progress through the additional casing 15 from the bottom to the top along the arrow F2 in a duct 25 traversing the additional casing 15 and extending parallel to the main axis X4 from the first intake 19. The through duct 25 guides the first incoming stream F2 to a mixing chamber 27 of the cartridge 11, by traversing the separation wall 45 which delimits the bottom of this mixing chamber 27. The mixing chamber 27 is thus partially defined by the common part 46. The through duct 25 is formed by the common part 46 and is integrally formed with the wall 45.

At the same time, as shown in FIG. 1, the second incoming stream enters the additional casing 15 via the second intake 21, and flows from the bottom to the top along the arrow C2 through the additional casing 15 in a baffle duct 32 which generally extends from the bottom to the top from the second intake 21. This baffle duct 32 is formed by the common part 46, and is integrally formed with the wall 45. More specifically, the baffle duct 32 comprises a first portion 31 that is substantially parallel to the main axis X4 and extends from the second intake 21. The baffle duct 32 then comprises a portion 29 that may be closed by a shutter 87 which is described in more detail below, wherein the closable portion 29 extends the first portion 31. Finally, the baffle duct 32 comprises a third portion 35 that is substantially parallel to the main axis X4 and feeds the second incoming stream C2 to the cartridge 11 while extending the closable portion 29. The closable portion 29 extends obliquely with respect to the first portion 31 and the third portion 35 so that the baffle duct 32 forms an "S". The third portion 35 opens into the mixing chamber 27. Thus, the two incoming streams F2 and C2 are admitted inside the mixing chamber 27 of the cartridge 11 in order to be mixed and so form an outgoing stream M3 that is intended to form the stream M1.

The mixing chamber 27 comprises an intake 39 for the first stream F2, a second intake 41 for the second stream C2, and an outlet 43 for the outgoing stream M3. The through duct 25 extends from the intake 39 as a continuation of the latter, while the baffle duct 32 extends from the intake 41 as a continuation of the latter, wherein the intakes 39 and 41 are formed in the separation wall 45. In this case, the separation wall 45 is of generally discoidal shape centered on the main axis X4, while the intakes 39 and 41 and the outlet 43 are distributed about the main axis X4.

In the illustrated example, the mixing means 13 comprise a set of mixing discs 13A, 13B and 13C, which are contained in the mixing chamber 27, as may be seen in FIGS. 1 and 2. The mixing discs 13A, 13B and 13C are in surface contact with each other and extend in planes orthogonal to the main axis X4. The set of mixing discs comprises an upper disc 13A, an intermediate disc 13B and a lower disc 13C, wherein the upper disc 13A and intermediate disc 13B may be moved relative to the disc 13C which is fixed, while the intermediate disc 13B is in sliding contact and sealed with the 13C disc. The intermediate disc 13B and lower disc 13C comprise a system of channels and holes (not shown), which are connected to the intakes 39 and 41 and the outlet 43 and which, as a function of the relative position of the discs 13B and 13C, regulate the respective flow rate of the incoming streams F2 and C2 that are admitted into the set of discs through the intakes 39 and 41. As represented by the arrows F3 and C3, the incoming streams circulate in the system of channels and holes and first traverse the lower disc 13C, then into the intermediate disc 13B. The incoming streams F3 and C3 then flow again through the lower disc 13C from top to bottom. During their passage through the discs 13A, 13B and 13C, the incoming streams F3 and C3 are brought into contact in order to be mixed and form the outgoing stream M3. The outgoing stream M3 is at a temperature $T_M$, while the ratio of the flow rates of the incoming streams F3 and C3 make it possible to adjust the temperature $T_M$, and the value of the flow rates of the incoming streams F3 and C3, thus making it possible to adjust the flow rate of the outgoing stream M3. In practice, the cross-section of the passage of the incoming streams F3 and C3 varies as a function of the relative position of the discs 13B and 13C, by placing the aforementioned channels and holes in communication. The ceramic discs and their channel system are not described in more detail because they constitute well-known mixing means as such, and are described, for example, in FR-B1-2 876 433. It should also be understood that, even if it is preferred to use a mixing chamber with ceramic discs, all known mixing means and cartridges usually used in mixer taps may be used instead.

The outgoing stream M3 that is formed by mixing within the mixing chamber 27 is then discharged out of the latter, and out of the cartridge 11 into an outlet chamber 37 of the mixer tap 1, wherein it guides the outgoing stream M3 from top to bottom to an outlet 47 formed through the support wall 23. The intakes 5 and 6 and the outlet 47 are distributed about the main axis X4. The common part 46 comprises a sealing crown 71 of the casing 15. This sealing crown 71 is circular and is centered on the main axis X4. In this case, the sealing crown 71 extends in an orthogonal plane P71 relative to the axis X4, and protrudes centrifugally with respect to the axis X4, from the separation wall 45 in order to be in sealing contact with the body 4. More precisely, the sealing crown 71 comprises a circular groove that opens radially outwards and is formed by the common part 46. This circular groove has thus an outer seal, e.g. O-ring shaped, which is crushed when it comes into contact with the body 4 as shown in the figures. The sealing crown 71 thus delimits an upper portion of the outlet chamber 37, wherein the latter is also delimited laterally by the wall of the body 4, and at the bottom by the support wall 23. As may be seen in FIG. 4 the outlet chamber 37, the through duct 25 and the baffle duct 32 are evenly distributed around the main axis X4. As shown in FIGS. 1 and 2, the outgoing stream M3 is thus discharged into a lower chamber 50 of the body 4 via the outlet 47. The lower chamber 50 is delimited at the top by the wall 23, laterally by the body 4, and below by a bottom 49 of the mixer tap 1. The bottom 49 is substantially discoidal and orthogonal to the main axis X4, and closes the body 4 at the lower end thereof. In the lower chamber 50, the outgoing stream M3 is led, according to the arrow M4, to the spout 3 via an access opening 51 formed radially in the wall of the body 4 relative to the main axis X4, thus bringing the lower chamber 50 in communication with the spout 3. In the spout 3, the outgoing stream M4 becomes the outgoing stream M2, and then the outgoing stream M1, as mentioned above.

The mixing unit 2 further comprises a lever 7 which is movably mounted at the top of the cartridge 11 in order to protrude from the body 4 via the upper opening 9 and allow a user to operate the lever 7. The actuation of the lever 7 makes it possible to control the mixing means 13, and, in particular, to rotate the upper and intermediate discs 13A and 13B about an axis parallel to the main axis X4, or about the axis X4 itself, and in translation along an axis X13 which is orthogonal to the main axis X4. In general, the lever 7 forms a control member for actuating at least one of the discs 13A, 13B and 13C, and may thus control the respective flow rate of the first incoming stream F1 and the second incoming stream C1. Thus, the control member 7 makes it possible to adjust both the temperature and the flow rate of the outgoing stream M1 by adjusting the relative position of the discs of the disc assembly 13A, 13B and 13C. The mixer tap 1 and the cartridge 11 may thus be described as having "single-lever" actuation, insofar as the lever 7 makes it possible to control both the flow rate and the temperature of the outgoing stream M1 by adjusting the flow rates of the incoming streams F1 and C1. In practice, the lever 7:

- may pivot about the main axis X4, which causes the upper discs 13A and 13B to rotate about this same axis in order to adjust the ratio between the flow rate of the first and second incoming streams F1 and C1, and therefore the temperature of the outgoing stream M1, and
- may pivot about a second axis X7, which is orthogonal to the main axis X4, in order to translate the upper discs 13A and 13B along the axis X13, and so vary the flow rate of the first and second incoming streams equitably, and to adjust the outgoing flow rate.

The lever 7 is connected to the set of discs 13A, 13B and 13C, i.e. the mixing means 13, by an actuation mechanism which is not described in more detail, insofar as it is known as such.

The common part 46 also forms a peripheral cover 53 of the cartridge 11, and forms an outer casing wall of the cartridge 11 that is substantially cylindrical with a circular base about the main axis X4. The cover 53 encloses the mixing means 13, and laterally delimits the chamber 27 from the separation wall 45, from which it rises along the axis X4. The cover 53 also encloses the base of the lever 7, wherein the cartridge comprises a sealing crown 63 defining the top of the chamber 27 and attached to an upper end of the cover 53 opposite the separation wall 45. A nut 65, centered on the main axis X4, holds the mixing unit 2 against the support wall 23 via the sealing crown 63. In practice, the nut 65 comprises an external thread which is screwed into an internal thread 69 of the upper opening 9 of the body 4, wherein the thread 69 is centered on the axis X4. The mixing chamber 27 is thus closed in the upper part by the base of the lever 7, its mechanism and the sealing crown 63.

Figure 3:
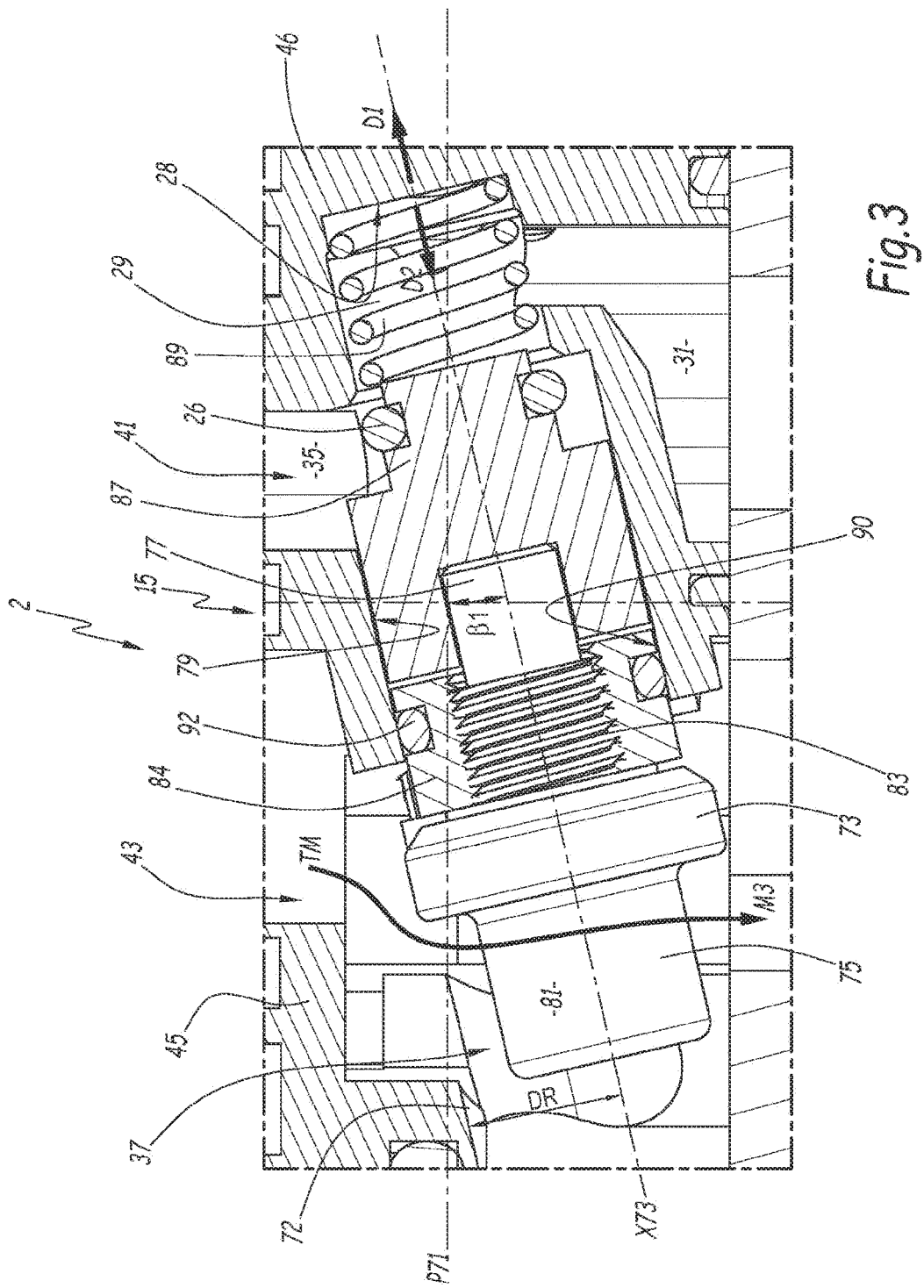
FIG. 3 shows a view of a detail of FIG. 1, on a larger scale, according to the frame III.

The mixing unit 2 also comprises thermostatic means, visible in particular in FIGS. 1 and 3, which comprise first of all a thermostatic element 73, extending along a sealing axis X73 comprised in the plane of FIG. 1. The sealing axis X73 and the orthogonal plane P71 intersect. In other words, the sealing axis X73 is inclined with respect to this plane P71 and passes through it. The closable portion 29 of the baffle duct 32 extends substantially coaxially to the sealing axis X73. Preferably, the sealing axis X73 forms an angle of inclination β1 between 1° and 45° with the orthogonal plane P71, and preferably equal to 13°.

As may be seen, in particular, in FIG. 3, along the sealing axis X73, the thermostatic element 73 comprises a thermosensitive portion 75 mounted in a housing 79 of the common part 46. The housing 79 is a duct that is coaxial with the sealing axis X73, which is formed in the additional casing 15 in order to connect the outlet chamber 37 and the baffle duct 32. The housing 79 thus brings the outlet 47 into communication with the second intake 21.

The thermosensitive portion 75 forms a fixed part of the thermostatic element 73 and comprises, in particular, along the sealing axis X73, a cup 81 which protrudes from the housing 79 and which extends into the passage of the outgoing stream M3 at the outlet 47. The cup 81 has a generally cylindrical shape with a circular base centered on the sealing axis X73, and encloses a heat-expandable body which is, for example, a suitable wax. As the cup 81 is in contact with the outgoing stream M3, the heat-expandable body expands and contracts as a function of the temperature $T_M$ of the outgoing stream M3.

The thermosensitive portion 75 also comprises a guide 83, which extends the cup 81 along the sealing axis X73, and by means of which the thermosensitive portion 75 is mounted in the housing 79. The guide 83 has the form of a screw with an external thread about the sealing axis X73, and extends at least partially within the housing 79. In this case, the guide 83 is screwed into a support ring 84 provided with an internal thread and coaxial with the axis X73, wherein the support ring 84 is itself fixed within an end 90 of the housing 79. The end 90 forms an end portion of the housing 79 extending from the outlet 47, in contact with the outlet chamber 37. The support ring 84 is partially inserted into the end 90, and has a seal 92 with the housing 79, in order to seal the latter in a waterproof manner and thus prevent any water transfer from the second stream C2 into the outlet 47 via the housing 79. The support ring 84 is fixed to the housing 79 by means of fasteners 94 of the screw type shown schematically in FIG. 4. The fixing elements 94 are located in a wall of the chamber 37, which forms the periphery of the end 90. The thermostatic element 73 is thus housed in the housing 79 in order to close off communication between the outlet 47 and the second entry 21.

The thermostatic element 73 also comprises a mobile portion 77, which forms a cylindrical piston that is coaxial with the sealing axis X73. The movable portion 77 is mounted within the guide 83, in order to be translatable relative to the thermosensitive portion 75 away from the thermosensitive portion 75, in the direction of the baffle duct 32, along the sealing axis X73 under the action of the thermo-expandable body contained in the cup 81.

A shutter 87 that belongs to the thermostatic element 73 is provided within the closable portion 29, and is designed to be displaced in translation along the sealing axis X73 by the mobile part 77. The shutter 87 is arranged relative to the movable portion 77 so that the latter may push the shutter 87 to a position to close the second intake 21, wherein a seal 26 of the shutter 87, formed by, for example, an outer O-ring, closes the sealing portion 29 In this case, the mobile portion 77 is in contact with the shutter 87 in order to push the shutter 87 away from the thermosensitive portion 75 in a direction D1 that is parallel to the axis X73, under the action of the heat-expandable body contained in the cup 81. Due to the inclination of the axis X73 relative to the plane P71, the thermostatic element 73 is further away from the mixing means 13 than is the shutter 87.

The shutter 87 is compressed between the free end of the mobile portion 77 and a return spring 89. The latter is itself compressed between the shutter 87 and an opposite wall 28 of the sealing portion 29 of the baffle duct 32. The opposite wall 28 extends in a plane orthogonal to the axis X73. The return spring 89 is therefore a compression spring, designed to return the shutter 87 in a direction D2 opposite to D1, to an open position of the baffle duct 32 and thus the second intake 21.

The shutter 87 is therefore designed to close the second intake 21 by closing the closable portion 29, according to a variable degree of closure depending on the expansion of the heat-expandable body, and therefore the temperature $T_M$, in order to vary the flow rate of the second incoming stream C2 accordingly. When the temperature $T_M$ reaches a predetermined threshold, for example 50° C., the stream C2 is totally, or at least partially, interrupted by closing off the second intake 21.

The mixing unit 2 is designed to be inserted in one piece into the body 4 of the mixer tap 1 via the upper opening 9. Prior to this step of inserting the unit 2, the chamber outlet 37 is open and forms a clearance space due to the absence of the body 4 of the mixer tap 1. The thermostatic element 73 may be mounted by inserting the latter in the housing 79 in the direction D1 via the end 90, which is therefore an "insertion end". Preferably, the clearance space of the chamber 37 is shaped so that the thermostatic element 73, the shutter 87 and the spring 89 may be placed in this clearance space along the axis X73, and then pushed in the direction D1 to be inserted in the housing 79 by the insertion end 90, without requiring separation of the additional casing 15 and the cartridge 11. This configuration of the chamber 37 is made possible by the fact that inclination of the axis X73 relative to the plane P71, thanks to which the thermostatic means pass by the sealing crown 71 when they are translated along the axis X73 in the chamber 37. Without this inclination of the axis X73, the sealing crown 71 would oppose the free movement of the aforementioned thermostatic means along the axis X73 within the chamber 37. It should be understood that the angle of inclination β1 of the axis X73 with respect to the plane P71 is chosen so that the sealing means do not interfere with the sealing crown 71.

Figure 4:
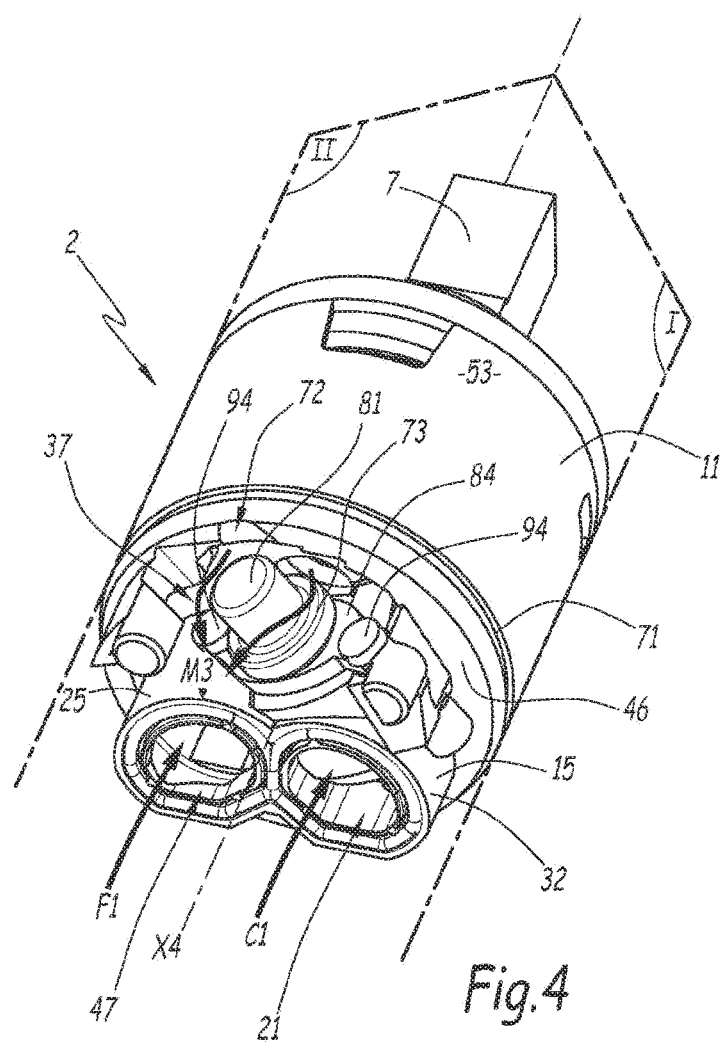
FIG. 4 shows a perspective view from below of the mixing unit of FIGS. 1 to 3, in which planes I-I and II-II correspond to the respective sectional planes of FIGS. 1 and 2.

A notch 72, visible in FIGS. 3 and 4, is formed in the sealing crown 71 at a point of the circumference of the latter. This notch 72 has a cylindrical profile that is coaxial with the axis X73, and has a radius DR. The radius DR is greater than the radial bulk, i.e. the maximum radius relative to the axis X73 of the thermostatic means. When the aforementioned thermostatic means are mounted within the housing 79, they are traversed by the plane P71 and surrounded by the sealing crown 71. In general, to allow the clearance of the thermostatic means, it is expected that the clearance space should extend at least on a cylinder that is coaxial with the X73 axis, starting at the insertion end 90 towards the outlet chamber 37 and having a radius equal to the radius DR.

Finally, the inclination of the axis X73 implies that the sealing crown 71 may be placed at a relatively small distance from the lower face 24, despite the bulk of the thermostatic means and the constraints related to their mounting within the mixing unit 2. Thus, this mixing unit 2 is particularly compact and is adapted to the geometry of the existing mixer taps.

Figure 5:
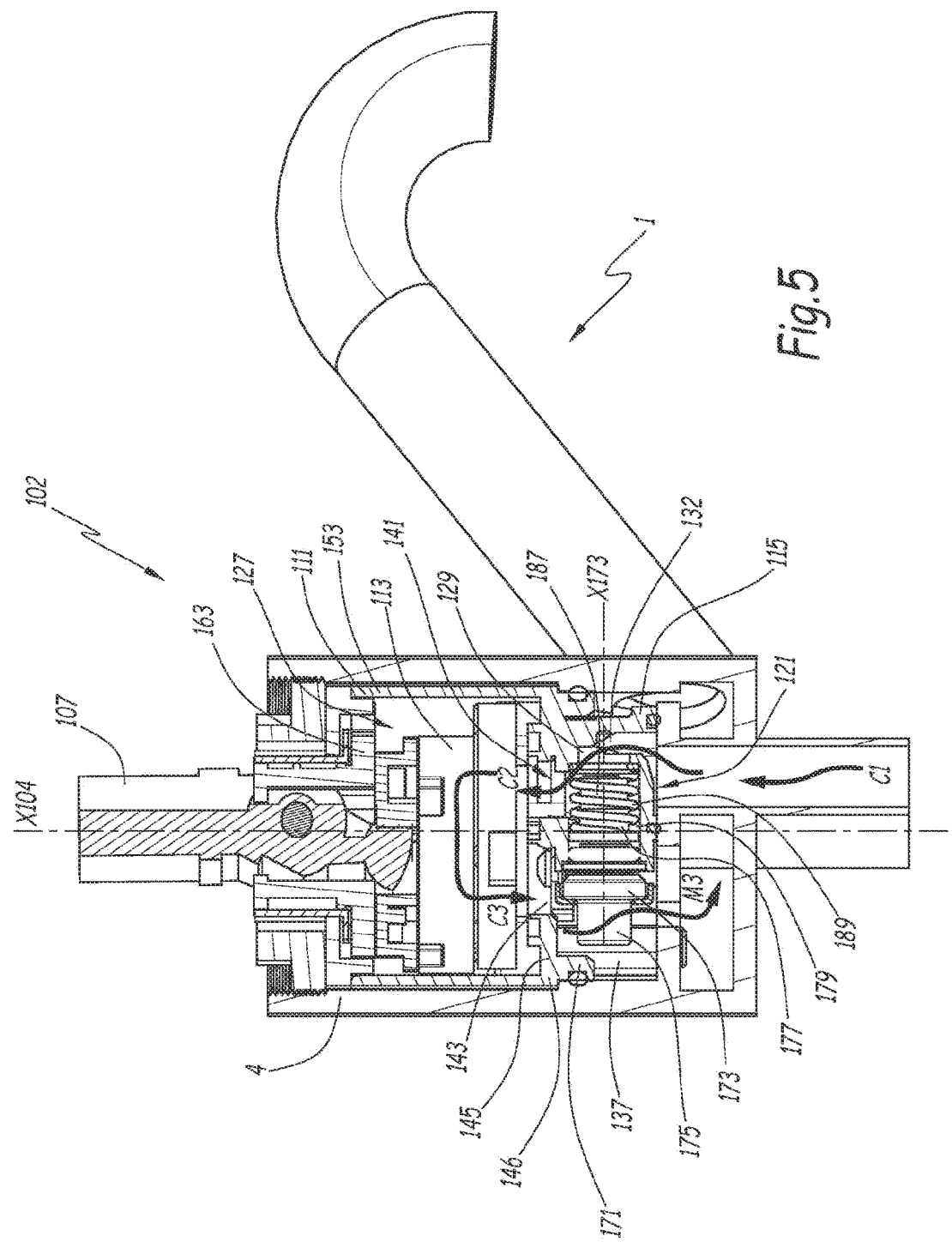
FIG. 5 shows a view, similar to that of FIG. 1, of a mixer tap comprising a mixing unit according to a second embodiment according to the invention.

FIG. 5 shows a mixing unit 102 according to a second embodiment and which has similar characteristics with the mixing unit 2 of the first embodiment described above and shown in FIGS. 1 to 4, wherein these similar characteristics are designated by an identical tracing in the drawing, and/or reference numbers increased by 100. The following description is therefore centered on the differences between the first and the second embodiment.

Like the mixing unit 2, the mixing unit 102 comprises a first intake for a first incoming stream that is not visible in FIG. 5, as well as a second intake 121 for a second incoming stream C1. A baffle duct 132, with a closable portion 129 extends from the second intake 121. The baffle duct 132 extends to a first intake 141 of a mixing chamber 127. The unit 102 also comprises mixing means 113 to form an outgoing stream M3, an outlet 143 with an outlet chamber 137 and a housing 179. The mixing unit 102 also comprises a control member 107, thermostatic means comprising, on the one hand, a thermostatic element 173 comprising both a thermosensitive part 175 and a mobile portion 177, and secondly a shutter 187 with a return spring 189. The movable portion and the shutter 187 are movable in translation along a sealing axis X173 that is orthogonal to a main axis X104 defined by the generally cylindrical shape of the mixing unit 102.

The mixing unit 102 is integrated in the same body 4 of the mixer tap 1 as that of FIGS. 1 to 4. The mixing unit 102 comprises a cartridge 111 and an additional casing 115, wherein a common part 146 forms a portion of the mixing chamber 127, disposed within the cartridge 111, and a portion of the additional casing 115. The part 146 forms a sealing crown 171 of the mixing unit 2 with the body 4 of the mixer tap 1, wherein the crown 171 protrudes centrally relative to the main axis X104. The part 145 also forms, in one piece, a cover 153 of the cartridge 111, the baffle duct 132, the outlet chamber 137 and the through duct (not visible in FIG. 5). The cover 153 is partially closed by a closure ring 163.

The mixing units 2 and 102 are particularly easy to manufacture and mount in the body 4 of the tap 1, insofar as it is not necessary to proceed to the assembly of an additional casing on a cartridge before introduction into the body 4, wherein the additional casing and the cartridge form a unit. The number of parts needed to manufacture the mixing unit 2 is advantageously reduced.

Water streams are implemented in the above. However, other fluids may be used instead of water, preferably liquid fluid streams. In general, the intake 5 corresponds to an intake of a first incoming stream F1 of fluid having a first temperature Tf, whereas the intake 6 corresponds to an intake of a second incoming stream C1 of fluid having a second temperature Tc which is higher than the first temperature Tf. The fluids of the first incoming stream F1 and the second incoming stream C1 are preferably identical and liquid, but may, however, be of a different nature. The water escaping from the spout 3 thus corresponds to an outgoing stream M1 of fluid, which is formed by mixing the first and second incoming stream F1 and C1 within the mixer tap 1.

The embodiments and variants defined above may be combined to create new embodiments.

The invention claimed is:

1. A mixing unit for a mixer tap, wherein the mixing unit has a generally cylindrical shape defining a main axis of the mixing unit, wherein the mixing unit comprises:
   a cartridge, comprising a mixing chamber, traversed by the main axis, wherein the mixing chamber comprises:
      a first intake of a first incoming stream of fluid having a first temperature,
      a second intake of a second incoming stream of fluid having a second temperature greater than the first temperature, and
      an outlet outside the mixing chamber for an outgoing stream of fluid,
   a mixer mixing the first and second incoming streams to form the outgoing stream, wherein the mixer is contained in the mixing chamber, the mixer comprising a set of mixing discs contained in the mixing chamber, wherein the mixing discs are in surface contact with one another and extend in planes that are orthogonal to the main axis;

an additional casing extending out of the mixing chamber, wherein the additional casing is traversed by the main axis, a thermostatic unit mounted within the additional casing and comprising:
- a thermostatic element, which comprises both a thermosensitive portion disposed at least partially at the outlet, and a portion mobile in translation relative to the thermosensitive portion, and
- a shutter of the second intake, which is translationally connected to the portion mobile in translation, wherein the mixing unit comprises a single-piece common part which at least partially delimits the mixing chamber while forming at least a portion of the additional casing, wherein the common part forms a separation wall between the cartridge and the additional casing; wherein the separation wall extends in a plane that is orthogonal to the main axis, wherein the first intake, the second intake and the outlet are formed through the separation wall while being distributed about the main axis.

2. The mixing unit according to claim 1, wherein the mixing unit comprises a control member, in the form of a lever, that is movably mounted on the top of the cartridge, to control the mixer and thus control the respective flow rate of the first incoming stream and the second incoming stream.

3. The mixing unit according to claim 1, wherein the set of mixing discs comprises three mixing discs.

4. The mixing unit according to claim 1, wherein the common part forms a peripheral cover delimiting the mixing chamber, wherein the peripheral cover rises from the separation wall.

5. The mixing unit according to claim 4, wherein the mixing unit comprises a sealing crown which is attached to the peripheral cover opposite the separation wall to at least partially close the mixing chamber.

6. The mixing unit according to claim 1, wherein the common part forms a through duct of the additional casing and extends from the first intake.

7. The mixing unit according to claim 1, wherein the common part forms a baffle duct of the additional casing, wherein the baffle duct extends from the second intake and is designed to be closed by the shutter.

8. The mixing unit according to claim 1, wherein the common part forms a housing of the additional casing, wherein the thermostatic element is mounted in this housing.

9. The mixing unit according to claim 1, wherein the mixing unit comprises a sealing crown of the mixing unit with a body of the mixer tap, wherein the sealing crown extends in a plane that is orthogonal with respect to the main axis, wherein the sealing crown comprises both a circular groove that is centered on the main axis and that is formed by the common part, and a seal mounted within this circular groove.

10. The mixing unit according to claim 9, wherein:
- the mobile part is movable in translation relative to the thermosensitive part along a sealing axis, and
- the orthogonal plane and the sealing axis intersect, wherein the sealing axis is inclined with respect to this orthogonal plane and traverses it.

11. A mixer tap equipped with a mixing unit according to claim 1.

* * * * *